(12) United States Patent
Stokes (10) Patent No.: US 11,700,243 B2
(45) Date of Patent: Jul. 11, 2023

(54) METHOD AND SYSTEM FOR ASYNCHRONOUS SIDE CHANNEL CIPHER RENEGOTIATION

(71) Applicant: ACTION STREAMER, LLC, Cincinnati, OH (US)

(72) Inventor: Richard Stokes, Glenview, IL (US)

(73) Assignee: ACTION STREAMER, LLC, Cincinnati, OH (US)

(*) Notice: Subject to any disclaimer, the term of this patent is extended or adjusted under 35 U.S.C. 154(b) by 83 days.

(21) Appl. No.: 17/390,375

(22) Filed: Jul. 30, 2021

(65) Prior Publication Data
US 2021/0359983 A1 Nov. 18, 2021

Related U.S. Application Data

(63) Continuation of application No. 16/562,525, filed on Sep. 6, 2019, now abandoned.

(51) Int. Cl.
*H04L 9/40* (2022.01)
*H04L 9/06* (2006.01)
(Continued)

(52) U.S. Cl.
CPC .......... *H04L 63/0478* (2013.01); *H04L 9/065* (2013.01); *H04L 9/0618* (2013.01); *H04L 47/825* (2013.01)

(58) Field of Classification Search
CPC ... H04L 63/0478; H04L 9/0618; H04L 9/065; H04L 47/825
(Continued)

(56) References Cited

U.S. PATENT DOCUMENTS 5,311,596 A 5/1994 Scott et al.
5,404,403 A 4/1995 Bright et al.
(Continued)

OTHER PUBLICATIONS

Karthikeyan Bhargavan; Verified Models and Reference Implementations for the TLS 1.3 Standard Candidate; IEEE: 2017; pp. 483-502.*
(Continued)

*Primary Examiner* — Monjur Rahim
(74) *Attorney, Agent, or Firm* — Panitch Schwarze Belisario & Nadel LLP (57) ABSTRACT

A method for asynchronous side channel cipher renegotiation includes: establishing, by a first computing device, a first communication channel and a second communication channel with a second computing device, where the first communication channel is an encrypted tunnel and packages exchanged using the encrypted tunnel are encrypted using a first cipher; receiving, by a receiver of the first computing device, a renegotiation request from the second computing device using the second communication channel, where the renegotiation request includes at least a password value and a relative time; generating, by a processor of the first computing device, a second cipher using at least an encryption protocol and the password value; receiving, by the receiver of the first computing device, a new encrypted packet from the second computing device using the first communication channel; and decrypting, by the processor of the first computing device, the new encrypted packet using the second cipher.

16 Claims, 5 Drawing Sheets

(51) Int. Cl.
  *H04L 9/08* (2006.01)
  *H04L 9/32* (2006.01)
  *H04L 47/70* (2022.01)

(58) Field of Classification Search
  USPC .......................................................... 713/153
  See application file for complete search history.

(56) References Cited

U.S. PATENT DOCUMENTS

| | | | |
|---|---|---|---|
| 7,310,730 B1 | 12/2007 | Champagne et al. | |
| 7,436,965 B2 | 10/2008 | Sherman | |
| 8,422,687 B2 | 4/2013 | Oksman et al. | |
| 8,543,805 B2 | 9/2013 | Ovsiannikov | |
| 8,613,071 B2 | 12/2013 | Day et al. | |
| 8,667,265 B1 | 3/2014 | Hamlet et al. | |
| 8,705,743 B2 * | 4/2014 | Howard | H04L 63/104 380/255 |
| 8,843,737 B2 * | 9/2014 | Chunduri | H04L 63/166 713/168 |
| 9,578,016 B2 * | 2/2017 | Shah | H04L 63/0281 |
| 9,654,505 B2 * | 5/2017 | Kanekar | H04L 67/1027 |
| 9,888,037 B1 * | 2/2018 | Sharifi Mehr | H04L 63/205 |
| 10,178,181 B2 | 1/2019 | Ben-nun et al. | |
| 10,250,573 B2 | 4/2019 | Wasiq et al. | |
| 2004/0161111 A1 | 8/2004 | Sherman | |
| 2011/0119487 A1 | 5/2011 | Alexander et al. | |
| 2011/0154019 A1 | 6/2011 | Wang | |
| 2011/0231653 A1 | 9/2011 | Bollay et al. | |
| 2013/0024684 A1 | 1/2013 | Chunduri et al. | |
| 2019/0102569 A1 | 4/2019 | Khandani | |
| 2019/0289042 A1 | 9/2019 | Perreault et al. | |
| 2021/0075777 A1 | 3/2021 | Stokes | |

OTHER PUBLICATIONS

"Beam: The World's Most Advanced Router," (https://www.indiegogo.com/projects/beamapps-computers#/) (10 pages).

"Digital Signatures in SSL and TLS," This build: May 25, 2018, Copyright IBM Corporation 1999,2014, This topic's URL: https://www.ibm.com/support/knowledgecenter/SSFKSJ_7.1.0/com.ibm.mq.doc/sy10520_.htmsy10520 (2 pages).

"Flter: Privacy & Security Router by Flter—Kickstarter," https://www.kickstarter.com/projects/flter/flter-privacy-and-security-router, (22 pages).

Third-Party Cookies Vs First-Party Cookies—Opentracker, https://www.opentracker.net/article/third-party-cookies-vs-first-party-cookies, (3 pages).

"TLS Handshake Protocol," Microsoft Docs, (May 30, 2018), https://docs.microsoft.com/en-us/windows/desktop/secauthn/tls-handshake-protocol, (3 pages).

Dierks et al., "RFC 5246—The Transport Layer Security (TLS) Protocol Version 1.2," (Aug. 2008), (105 pages).

He et al., "Online Identification of Tor Anonymous Communication Traffic," Journal of Software, (Mar. 2013), vol. 24, No. 3, pp. 540-556.

Husák et al., "Network-based HTTPS Client Identification Using SSL/TLS Fingerprinting," Conferences Paper, (Aug. 2015), Institute of Computer Science, Masaryk University, Brno, Czech Republic, pp. 1-8.

Kemmerer, "The SSL/TLS Handshake: an Overview—SSL.com," (Mar. 3, 2015), (4 pages).

Phung et al., "Lightweight Self-Protecting JavaScript," Proceedings of ACM Symposium on Information, Computer and Communications Security (ASIACCS 2009), pp. 47-60.

Raskin, "Flter uses VPN and Tor over your home network to protect privacy and security," 9to5Toys, (Mar. 29, 2017), https://9to5toys.com/2017/03/29/flter-privacy-and-security-router/ (4 pages).

* cited by examiner

METHOD AND SYSTEM FOR ASYNCHRONOUS SIDE CHANNEL CIPHER RENEGOTIATION

FIELD

The present disclosure relates to asynchronous side channel cipher renegotiation, specifically the use of an alternative communication channel to exchange data for use in renegotiating the cipher used in a primary communication channel that utilizes an encryption tunnel.

BACKGROUND

Communication channels are utilized between computing systems, devices, application programs, and other discrete components used to exchange data, packets, media, and other messages. In many cases, two computing systems or devices may maintain a single communication channel over a long period of time where data may be exchanged, to reduce the need to reconnect, which may require complicated authentication processes and interrupt user experiences. However, in many cases once a communication channel is established, it can be susceptible to attack by a nefarious entity that may seek to intercept communications or inject its own data.

Some methods to avoid the susceptibility of attacks in an established communication channel utilize asymmetric cryptography, such as through the use of shared secrets and cryptographic key pairs. In such methods, initial setup between the computing devices ensures the security of subsequent communications. However, asymmetric cryptography may not be available for all communication channels, particularly for peer-to-peer connections and other connections where ciphers may be necessary to encrypt communications between both endpoints.

Thus, there is a need for a technical system to enable renegotiation of the cipher used in an encrypted tunnel, to protect a communication channel even in instances where a nefarious party may gain access to an original cipher.

SUMMARY

The present disclosure provides a description of systems and methods for asynchronous side channel cipher renegotiation. Two endpoint devices that share an encrypted tunnel may have a side channel established for communication between the two devices. When one endpoint device wants to renegotiate the cipher used for communications exchanged via the encrypted tunnel, that endpoint device transmits a renegotiation request using the side channel, where the request includes a password and a relative time offset. Use of a relative time offset may be superior to using an absolute time, as it may avoid complications arising from mismatched clocks on devices, removing the need for synchronization, and can make it more difficult for a nefarious actor to replay encrypted network traffic later. Each device can independently generate a new cipher using the password and a known encryption algorithm and, when the relative time has elapsed, can begin using the new cipher to decrypt messages transmitted using the encrypted tunnel. To accommodate for different packet transmission speeds and times, the devices can both continue to utilize the original cipher for a predetermined period of time or number of packets, which can then be discarded. The result is a seamless handoff from one cipher to another for use in the encrypted tunnel. As a result, any nefarious party that may acquire a cipher may only be able to use that cipher until a renegotiation takes place, limiting the ability to perform any detrimental actions with the stolen cipher. Thus, security of communications between both devices can be increased without expending significant time and resources and without incurring dropped network connections as a result of packet loss.

A method for asynchronous side channel cipher renegotiation includes: establishing, by a first computing device, a first communication channel and a second communication channel with a second computing device, where the first communication channel is an encrypted tunnel and packages exchanged using the encrypted tunnel are encrypted using a first cipher; receiving, by a receiver of the first computing device, a renegotiation request from the second computing device using the second communication channel, where the renegotiation request includes at least a password value and a relative time; generating, by a processor of the first computing device, a second cipher using at least an encryption protocol and the password value; receiving, by the receiver of the first computing device, a new encrypted packet from the second computing device using the first communication channel; and decrypting, by the processor of the first computing device, the new encrypted packet using the second cipher.

A system for asynchronous side channel cipher renegotiation includes: a first computing device; a second computing device; a first communication channel established between the first computing device and the second computing device, where the first communication channel is an encrypted tunnel and packages exchanged using the encrypted tunnel are encrypted using a first cipher; and a second communication channel established between the first computing device and the second computing device, wherein the first computing device includes a receiver receiving a renegotiation request from the second computing device using the second communication channel, where the renegotiation request includes at least a password value and a relative time, and a processor generating a second cipher using at least an encryption protocol and the password value, wherein the receiver further receives a new encrypted packet from the second computing device using the first communication channel, and the processor further decrypts the new encrypted packet using the second cipher.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 1 is a block diagram illustrating a high level system architecture for asynchronous side channel cipher renegotiation in accordance with exemplary embodiments.

FIG. 2 is a block diagram illustrating a computing device for use in the system of FIG. 1 for asynchronous side channel cipher renegotiation in accordance with exemplary embodiments.

FIG. 3 is a flow diagram illustrating a process for renegotiation of a cipher using an asynchronous side channel by the computing device of FIG. 2 in accordance with exemplary embodiments.

FIG. 4 is a flow chart illustrating an exemplary method for asynchronous side channel cipher renegotiation in accordance with exemplary embodiments.

FIG. 5 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Cipher Renegotiation

Figure 1:
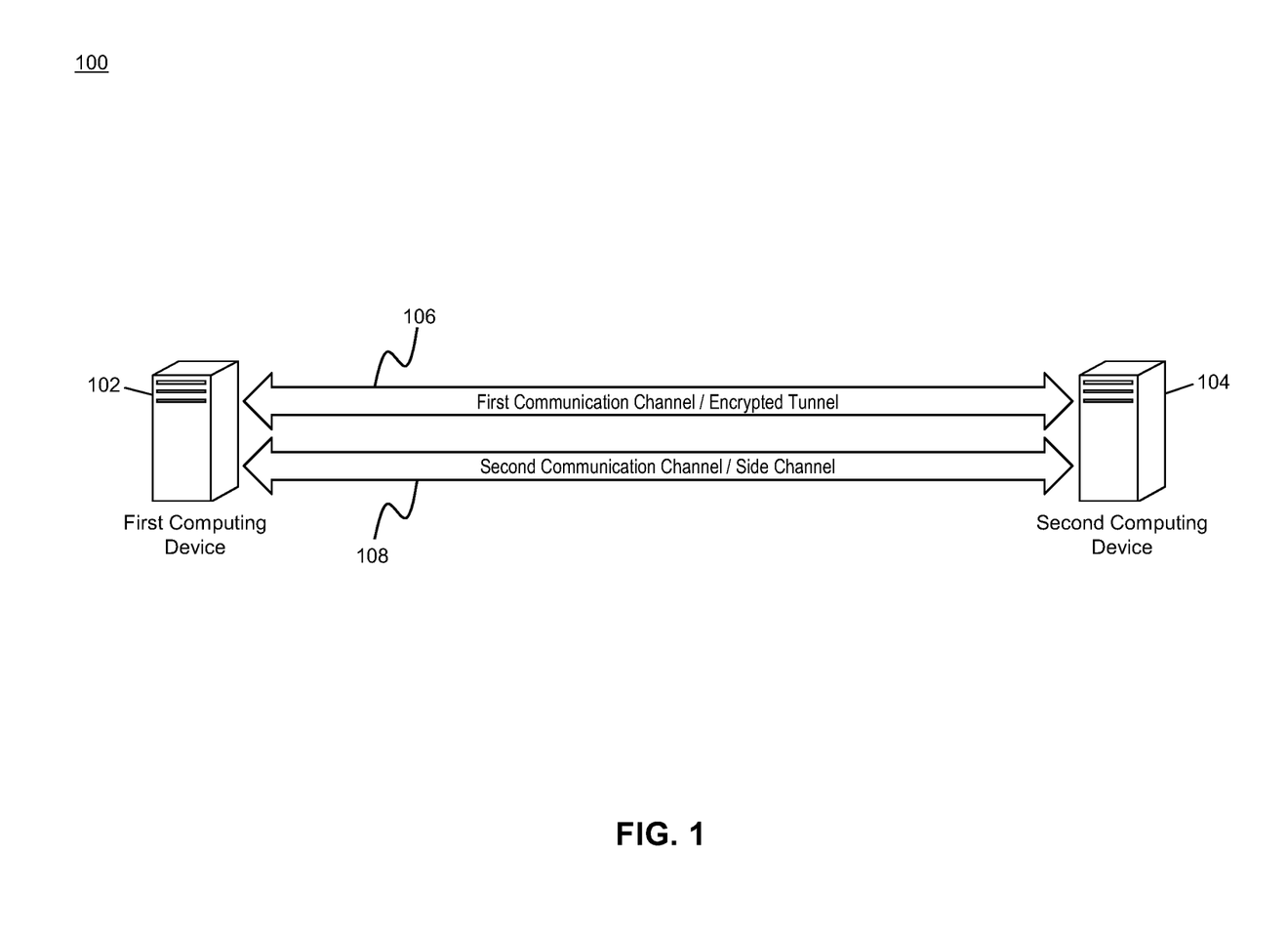

FIG. 1 illustrates a system 100 for the renegotiation of a cipher for communications made using an encrypted tunnel between two computing devices using an asynchronous side channel.

The system 100 may include a first computing device 102 and a second computing device 104. The computing devices, which may be computing devices 200 illustrated in FIG. 2 and discussed in more detail below, may be configured to exchange communications using a first communication channel 106. The first communication channel 106 may be an encrypted tunnel, where any data packets or other communications transmitted thereby may be encrypted via use of a cipher. For instance, the first computing device 102 may encrypt a data packet using the cipher, may transmit the encrypted data packet to the second computing device 104 using the first communication channel 106, and the second computing device 104 may then decrypt the data packet using the same cipher. The first communication channel 106 may utilize any communication protocol and method suitable for the operation and usage of an encrypted tunnel, such as user datagram protocol (UDP), secure shell (SSH), etc. While the system 100 in FIG. 1 illustrates the first computing device 102 and second computing device 104 as being separate and distinct devices, the first computing device 102 and second computing device 104 may be separate components in a single computing device, or one or more of the devices may be a component of a computing device that communicates with a separate computing device or a component in a separate computing device, such as a web extension of a web browsing application program that communicates with a network device or a web server.

The first computing device 102 or second computing device 104 may have a desire to be able to renegotiate the cipher used in the first communication channel 106 during the course of operation thereof. For instance, the first computing device 102 and second computing device 106 may want to keep the first communication channel 106 in operation for several hours or days, where renegotiation of the cipher may result in higher security without the need to interrupt or reestablish the first communication channel 106. In order to facilitate renegotiation, the first computing device 102 and the second computing device 104 may have a second communication channel 108 established between the two devices. The second communication channel 108 may be a side channel that may utilize a different communication protocol than the first communication channel. For instance, the first communication channel 106 may utilize UDP while the second communication channel 108 may utilize transmission control protocol (TCP). Any suitable type of communication method and protocol may be utilized by the second communication channel 108.

When the second computing device 104 wants to renegotiate the cipher, the second computing device 104 may electronically transmit a renegotiation request to the first computing device 102 using the second communication channel 108. While the methods and systems described herein have the second computing device 104 submitting the request, either computing device may submit a renegotiation request and thereby perform the functions of the second computing device 104. The renegotiation request may include at least a password value and a relative time. The password value may be a word, number, alphanumeric value, etc. that is used in generation of the new cipher. The relative time may be a time relative to the receipt and/or transmission of the renegotiation request at which time the devices are to begin to use the new cipher to encrypt/decrypt packets transmitted using the first communication channel 106.

The first computing device 102 may receive the renegotiation request using the second communication channel 108 and decrypt or otherwise parse the data therefrom using any suitable method. The first computing device 102 may then generate the new cipher using the password value from the renegotiation request and an agreed-upon encryption protocol, such as the advanced encryption standard (AES), triple data encryption algorithm (3DES), etc. The second computing device 104 may also independently generate the new cipher using the password value and the agreed-upon encryption protocol. In some embodiments, the renegotiation request may specify the encryption protocol to be used. In other embodiments, the encryption protocol may be specified in a separate communication, during establishment of the first communication channel 106 or second communication channel 108, or at another suitable time. In some cases, the computing devices may utilize the same encryption protocol for all ciphers generated for use with the first communication channel 106. In other cases, multiple encryption protocols may be used through the life of the first communication channel 106.

Once the new cipher has been generated by both devices, each of the computing devices 102 and 104 may start using the new cipher when encrypting and decrypting packets that are transmitted or received after the relative time has passed (e.g., or shortly before, such as in instances if packets are received before the first computing device 102 has officially changed to the new cipher). For instance, if the relative time is fifteen seconds, the first computing device 102 may start attempting to decrypt any packets received thirteen or fourteen seconds after receipt of the renegotiation request. Once the first computing device 102 receives a new data packet after the relative time has passed, they will utilize the new cipher when attempting to decrypt the new data packet. If the decryption fails, the first computing device 102 may attempt to use the original cipher for decryption. For example, due to transmission speeds and other factors, the first computing device 102 may still receive packets encrypted with the original cipher after the relative time has passed (e.g., the second computing device 104 may have transmitted a packet encrypted with the original cipher at 14.8 seconds, which may not be received by the first computing device 102 until 15.4 seconds).

The first computing device 102 may attempt to use the original cipher to decrypt any data packets where decryption using the new cipher fails. If the attempt using the original cipher fails as well, then the data packet may be discarded. This may result in the connection being dropped if the computing devices are not using a reliable connection protocol (e.g., including, but not limited to, TCP, which enables the computing devices to re-transmit dropped packets). If the original cipher is successful in decrypting the data packet, then the data packet may be processed as applicable. In some cases, the first computing device 102 may only attempt to use the original cipher upon failure of the new cipher for a predetermined period of time and/or predetermined number of packets. For example, the original cipher may only be used for ten seconds after the relative time has passed or for a maximum of ten packets, whichever is met first. Such limits may prevent the ability for a nefarious party that is able to identify the original cipher from taking advantage of the first computing device 102 or second computing device 104. In an exemplary embodiment, once the predetermined period of time or predetermined number of packets has been exceeded, the original cipher may be deleted from the first computing device 102. It will be apparent to persons having skill in the relevant art that the second computing device 104 may be programmed to perform the same functions for data packets sent from the first computing device 102 using the first communication channel 106.

The following code represents an example implementation in the first computing device 102 or the second computing device 104 of the processing of an incoming data packet using the new cipher, where the old cipher is attempted if decrypting using the new cipher fails:

The methods and systems discussed herein enable two computing devices 102 and 104 to renegotiate the cipher used in encrypting/decrypting communications made using an encrypted tunnel 106 via the use of an asynchronous side channel 108. The renegotiation of the cipher may ensure that the first communication channel 106 can be maintained over a long period of time with minimal risk to exposure of the underlying data being transmitted thereby due to changes to the cipher. The use of the asynchronous side channel facilitates the renegotiation in a manner that is easy and secure, enabling the renegotiation to occur using minimal computing resources and bandwidth, and negating the need for reconnecting or reestablishing the first communication channel 106. In addition, the use of separate communication protocols for both channels, deletion of the original cipher, use of the original cipher after the relative time has passed, and the use of relative time further enhances the security offered by the methods discussed herein while maintaining full reliability of the first communication channel 106. Accordingly, the methods and systems discussed herein provide for significant security advantages over traditional

```
func (s *UDPSession) processIncomingPacket(data [ ]byte) {
    dataValid := false
    // Must lock to prevent segmentation fault while changing ciphers
    s.mu.Lock( )
    if s.block != nil {
        var originaldata [ ]byte
        if s.oldblock != nil {
            // If the old block has been assigned an expiration time, check it
and delete if necessary. This improves performance.
            if s.oldexpires.Before(time.Now( )) {
                s.oldblock = nil
            } else {
                // For best performance, decryption should be performed
in-place to avoid unnecessary memory allocation. This destroys the original packet so
during a cipher change, the original packet is preserved for a possible second attempt.
                originaldata = make([ ]byte, len(data))
                copy(originaldata, data)
            }
        }
        s.block.Decrypt(data, data)
        // Calculate checksum using some common method
        _, validchecksum := calculateChecksum(data)
        if validchecksum {
            // Remove checksum from decrypted packet
            data = data[crcSize:]
            dataValid = true
        } else {
            // Decryption failed. Attempt using the prior cipher in case the
packets were still in the process of being transmitted after the cipher was renegotiated.
            if s.oldblock != nil {
                s.oldblock.Decrypt(data, originaldata)
                _, validchecksum := calculateChecksum(data)
                if validchecksum {
                    data = data[crcSize:]
                    dataValid = true
                }
            }
        }
    } else if s.block == nil {
        dataValid = true
    }
    s.mu.Unlock( )
    if dataValid {
        // Process decrypted packet
    }
}
``` systems without sacrificing convenience and reliability and without the need for new hardware and excessive communications.

Computing Device

Figure 2:
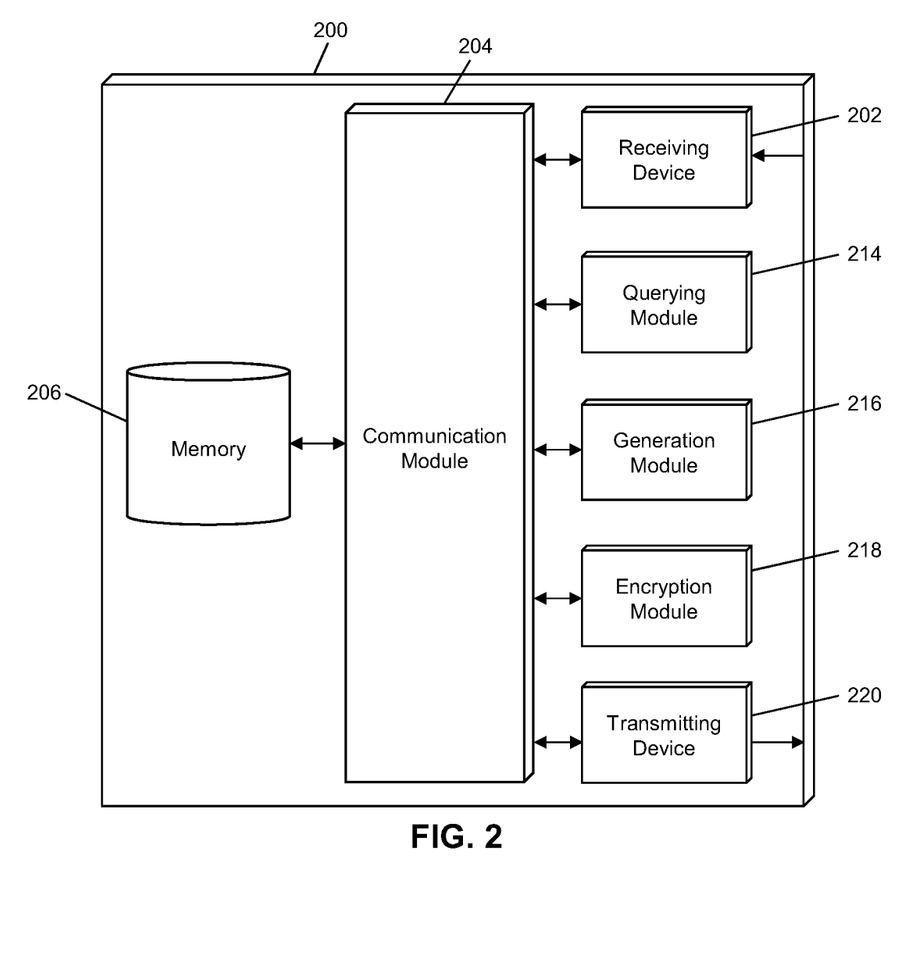

FIG. 2 illustrates an embodiment of a computing device 200 in the system 100. It will be apparent to persons having skill in the relevant art that the embodiment of the computing device 200 illustrated in FIG. 2 is provided as illustration only and may not be exhaustive to all possible configurations of the computing device 200 suitable for performing the functions as discussed herein. For example, the computer system 500 illustrated in FIG. 5 and discussed in more detail below may be a suitable configuration of the computing device 200. The first computing device 102 and second computing device 104 of the system 100 may be implemented as the computing device 200 as illustrated in FIG. 2 and discussed below.

The computing device 200 may include a receiving device 202. The receiving device 202 may be configured to receive data over one or more networks via one or more network protocols. In some instances, the receiving device 202 may be configured to receive data from other computing devices 200 and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other computing devices 200 that may be electronically transmitted using first communication channels 106 and second communication channels 108 and may be superimposed or otherwise encoded with data packets, which may be encrypted using any suitable means. Such data packets may include a renegotiation request, which may include a password value, relative time, and, in some cases, an encryption method. Some data packets may be encrypted using a cipher, which may be changed following a renegotiation processed as discussed herein.

The computing device 200 may also include a communication module 204. The communication module 204 may be configured to transmit data between modules, engines, databases, memories, and other components of the computing device 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 200 and external components of the computing device 200, such as externally connected databases, display devices, input devices, etc. The computing device 200 may also include a processing device. The processing device may be configured to perform the functions of the computing device 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, encryption module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 200 may include a querying module 214. The querying module 214 may be configured to execute queries on databases to identify information. The querying module 214 may receive one or more data values or query strings, and may execute a query string based thereon on an indicated database, such as a memory 206, to identify information stored therein. The querying module 214 may then output the identified information to an appropriate engine or module of the computing device 200 as necessary. The querying module 214 may, for example, execute a query on the memory 206 to identify an encryption algorithm for use in generating a new cipher based on a received password value.

The computing device 200 may also include a generation module 216. The generation module 216 may be configured to generate data for the computing device 200 as part of the functions discussed herein. The generation module 216 may receiving instructions as input, may perform generate data as instructed, and may output the generated data to another module or engine of the computing device 200. In some cases, data to be used in the generation may be included in the input. In some instances, the generation module 216 may be configured to identify data for use in the requested generation, such as by instructing the querying module 214 to perform one or more queries for data. The generation module 216 may, for example, be configured to generate ciphers using specific encryption algorithms and password values and generate data packets for transmission using the first communication channel 106 and second communication channel 108.

The computing device 200 may also include an encryption module 218. The encryption module 218 may be configured to encrypt or decrypt data for the computing device 200 for performing the functions discussed herein. The encryption module 218 may receive data as input for decryption or encryption, may encrypt or decrypt the data as instructed, and may output the result to another module or engine of the computing device 200. In some cases, the input may include the cipher to be used for encryption or decryption. In other cases, the encryption module 218 may be configured to identify the cipher to be used, such as by instructing the querying module 214 to execute a query on the memory 226 to identify a cipher for use. The encryption module 218 may be configured to, for example, encrypt or decrypt data packets that are transmitted or received using the first communication channel 106.

The computing device 200 may also include a transmitting device 220. The transmitting device 220 may be configured to transmit data over one or more networks via one or more network protocols. In some instances, the transmitting device 220 may be configured to transmit data to other computing devices 200 and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other computing devices 200 that are electronically transmitted using the first communication channel 106 or second communication channel 108, which may be superimposed or otherwise encoded with data packets. The data packets may be encrypted using a cipher or decrypted using a cipher. Some data packets may include a renegotiation request for use in renegotiating a cipher, which may include a password value, relative time, and, in some cases, an encryption algorithm.

The computing device 200 may also include a memory 206. The memory 206 may be configured to store data for use by the computing device 200 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing device 200 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, relative times, ciphers, password values, encryption algorithms, protocol data, communication channel information, etc.

Process Renegotiation of a Cipher

Figure 3:
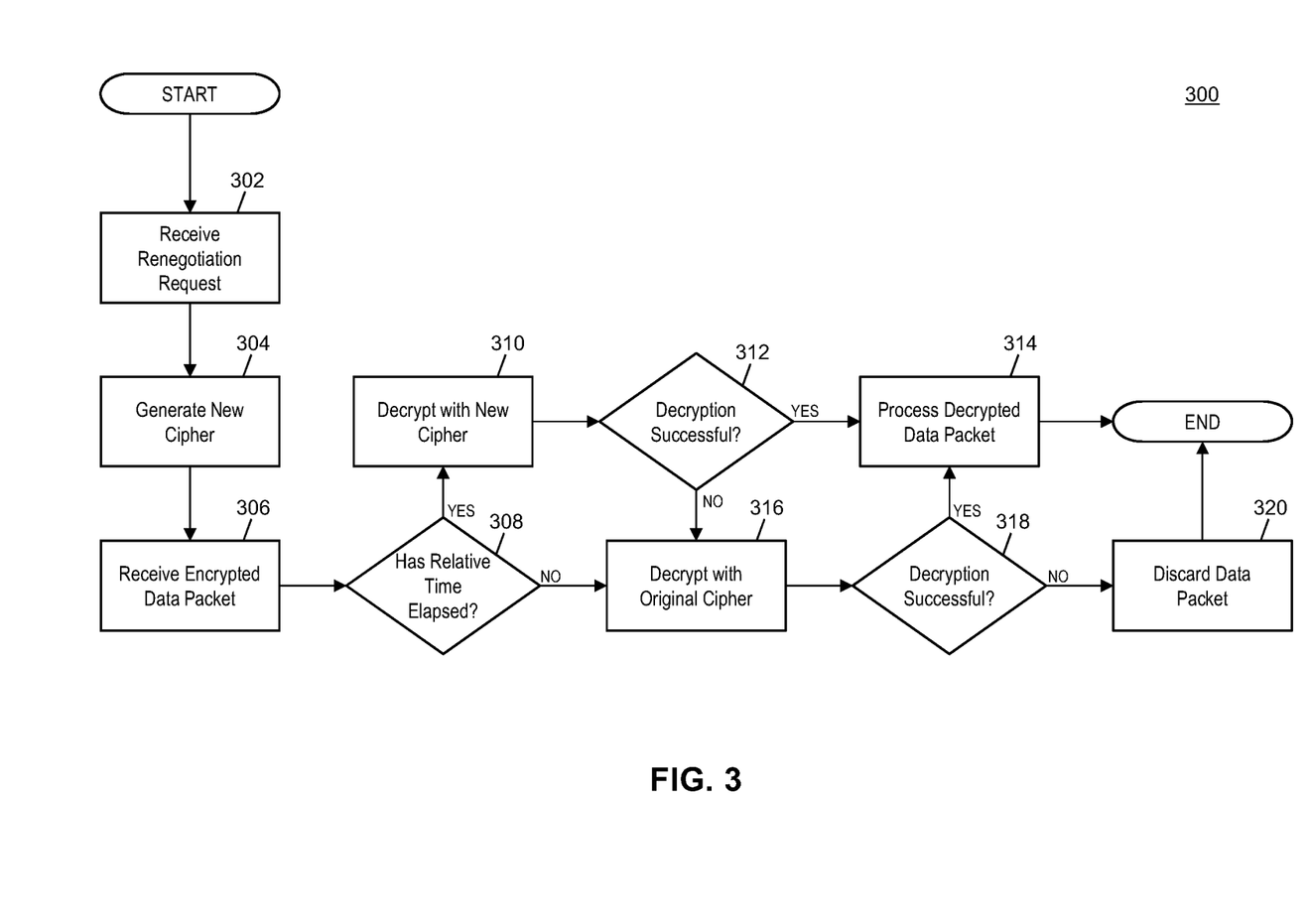

FIG. 3 illustrates a process 300 for the renegotiation of a cipher by the computing device 200, which may be the first computing device 102 and/or the second computing device 104 in the system 100 illustrated in FIG. 1, for use in encrypting and decrypting data packets transmitted using the first communication channel 106.

In step 302, the receiving device 202 may receive a renegotiation request from another computing device 200 transmitted using a second communication channel 108. The renegotiation request may include a password value and relative time, and, in some cases, may also include an indication of an encryption algorithm to use. The relative time may be a time represented in any suitable format, such as a number of seconds. In some cases, the receiving device 202 and/or other component in the computing device 200 (e.g., the encryption module 218) may decrypt or otherwise perform functions to parse data from the data packet received using the second communication channel 108.

In step 304, the generation module 216 of the computing device 200 may generate a new cipher using the password value from the renegotiation request and a predetermined encryption algorithm. The predetermined encryption algorithm may be specified in the renegotiation request, or may be already known to the computing device 200, such as based on a past communication with the other computing device. In step 306, the receiving device 202 of the computing device 200 may receive a new, encrypted data packet from the other computing device 200 that is electronically transmitted using the first communication channel 106.

In step 308, the computing device 200 may determine if the relative time specified in the renegotiation request has elapsed since receipt thereof. If the relative time has elapsed, then the new cipher is to be used in communications between the computing devices. In such cases, in step 310, the encryption module 218 of the computing device 200 may attempt to decrypt the encrypted data packet using the new cipher. In step 312, the computing device 200 may determine if the attempted decryption using the new cipher was successful. If the decryption is successful, then, in step 314, the computing device 200 may process the decrypted data packet using any suitable method, which may be based on the data contained in the data packet.

If, in step 308, the computing device 200 determines that the relative time has not yet passed, or, in step 312, the decryption of the data packet using the new cipher is unsuccessful, then, in step 316, the encryption module 218 of the computing device 200 may attempt to decrypt the encrypted data packet using the original cipher. In step 318, the computing device 200 may determine if decryption using the original cipher was successful. If the decryption is successful, then the process 300 may proceed to step 314 where the decrypted data packet may be processed. If decryption is unsuccessful in step 318, then, in step 320, the computing device 200 may discard the data packet. In some embodiments, steps 316 and 318 may only be attempted if decryption in step 312 is unsuccessful for a predetermined period of time or number of data packets following passage of the relative time in the renegotiation request. In such embodiments, if decryption is unsuccessful using the new cipher, the process 300 may proceed directly to step 320 for discarding of the data packet.

Exemplary Method for Asynchronous Side Channel Cipher Renegotiation

Figure 4:
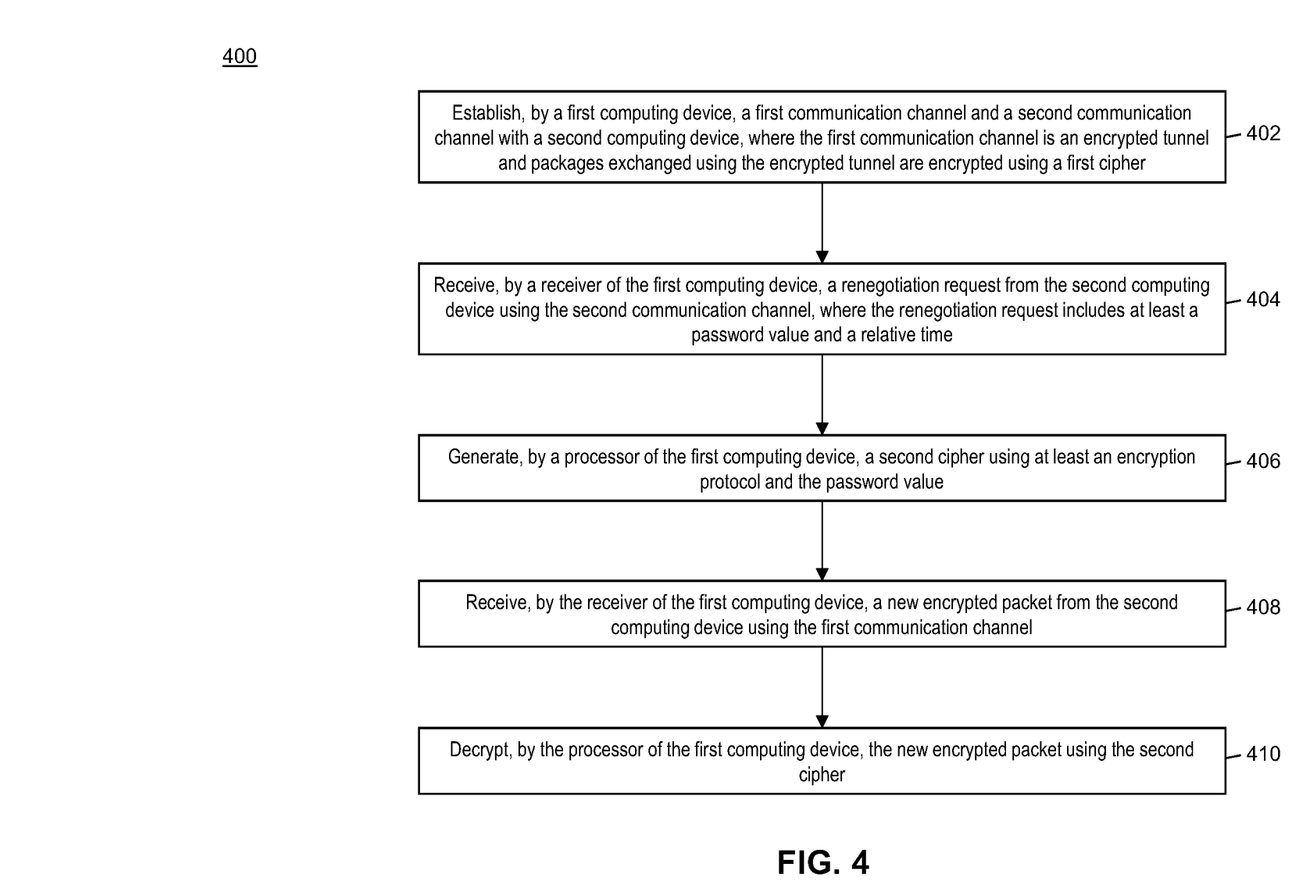

FIG. 4 illustrates a method 400 for renegotiation of a cipher for use in an encrypted tunnel utilizing an asynchronous side channel for transmission of a renegotiation request.

In step 402, a first communication channel (e.g., first communication channel 106) and a second communication channel (e.g., second communication channel 108) may be established by a first computing device (e.g., first computing device 102) with a second computing device (e.g., second computing device 104), where the first communication channel is an encrypted tunnel and packages exchanged using the encrypted tunnel are encrypted using a first cipher. In step 404, a renegotiation request may be received by a receiver (e.g., receiving device 202) of the first computing device from the second computing device using the second communication channel, where the renegotiation request includes at least a password value and a relative time.

In step 406, a second cipher may be generated by a processor (e.g., generation module 216) of the first computing device using at least an encryption protocol and the password value. In step 408, a new encrypted packet may be received by the receiver of the first computing device from the second computing device using the first communication channel. In step 410, the new encrypted packet may be decrypted by the processor (e.g., encryption module 218) of the first computing device using the new cipher.

In one embodiment, the renegotiation request may further include the encryption protocol. In some embodiments, the new encrypted packet may be received after the relative time has passed since receipt of the renegotiation request. In one embodiment, the method 400 may further include storing, in a memory (e.g., memory 226) of the first computing device, the first cipher and the second cipher. In some embodiments, the second communication channel may utilize a secure communication protocol.

In one embodiment, the method 400 may also include decrypting, by the processor of the first computing device, the new encrypted packet using the first cipher upon decryption failure using the second cipher. In a further embodiment, the first cipher may be used upon decryption failure for a predetermined period of time and/or predetermined number of received packets. In an even further embodiment, the method 400 may even further include deleting, by the first computing device, the first cipher from a memory of the first computing device after the predetermined period of time and/or predetermined number of received packets.

Computer System Architecture

Figure 5:
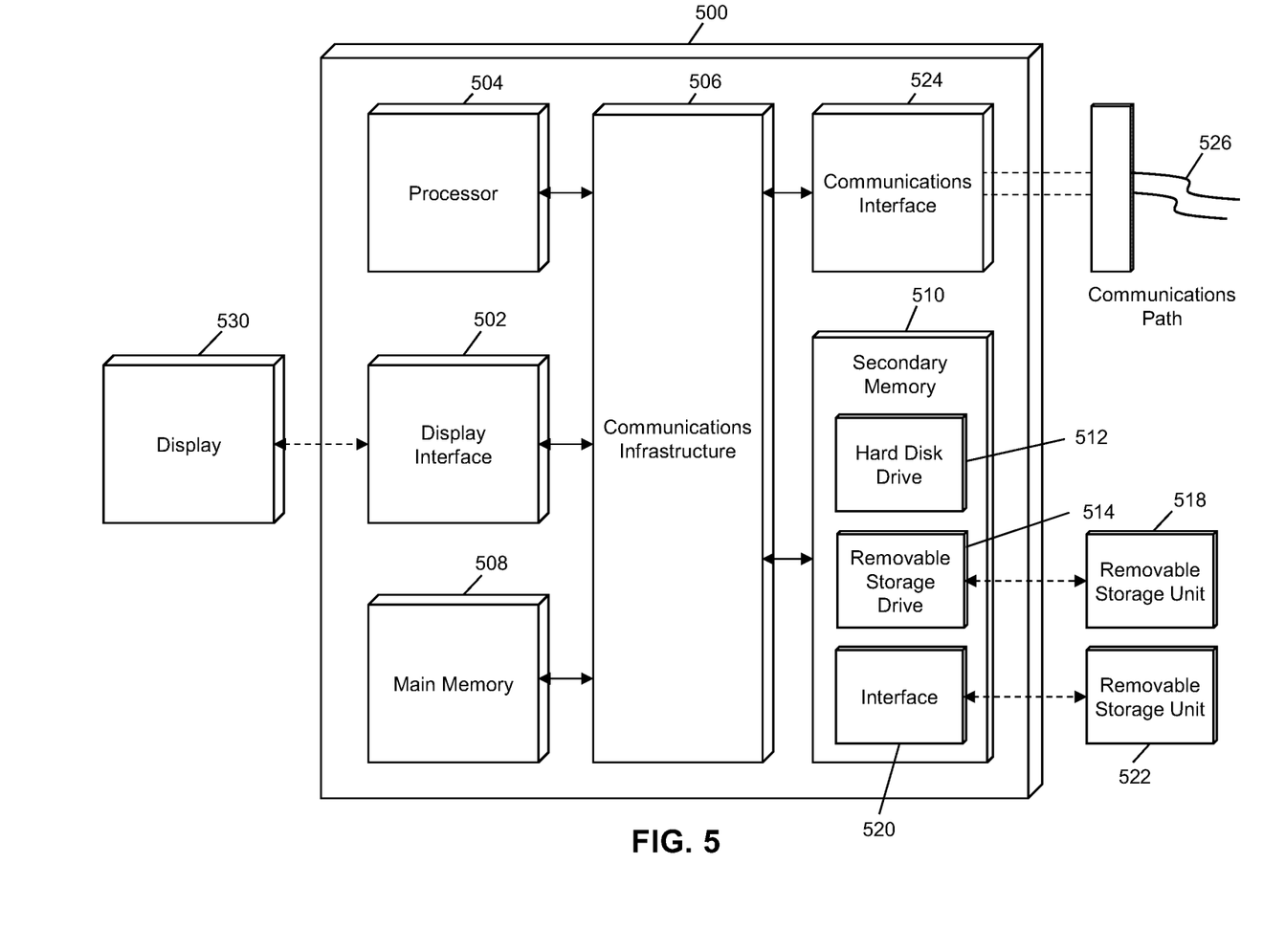

FIG. 5 illustrates a computer system 500 in which embodiments of the present disclosure, or portions thereof, may be implemented as computer-readable code. For example, the first computing device 102 or second computing device 104 of FIG. 1 or the computing device 200 of FIG. 2 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for asynchronous side channel cipher renegotiation. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for asynchronous side channel cipher renegotiation, comprising:
    establishing, by a first computing device, a first communication channel and a second communication channel with a second computing device, where the first communication channel is an encrypted tunnel and packages exchanged using the encrypted tunnel are encrypted using a first cipher;
    receiving, by a receiver of the first computing device, a renegotiation request from the second computing device using the second communication channel, where the renegotiation request includes at least a password value and a relative time;
    generating, by a processor of the first computing device, a second cipher using at least an encryption protocol and the password value;
    receiving, by the receiver of the first computing device, a new encrypted packet from the second computing device using the first communication channel; and
    decrypting, by the processor of the first computing device, the new encrypted packet using the second cipher.

2. The method of claim 1, wherein the renegotiation request further includes the encryption protocol.

3. The method of claim 1, wherein the new encrypted packet is received after the relative time has passed since receipt of the renegotiation request.

4. The method of claim 1, further comprising:
    decrypting, by the processor of the first computing device, the new encrypted packet using the first cipher upon decryption failure using the second cipher.

5. The method of claim 4, wherein the first cipher is used upon decryption failure for a predetermined period of time and/or predetermined number of received packets.

6. The method of claim 5, further comprising:
    deleting, by the first computing device, the first cipher from a memory of the first computing device after the predetermined period of time and/or predetermined number of received packets.

7. The method of claim 1, further comprising:
    storing, in a memory of the first computing device, the first cipher and the second cipher.

8. The method of claim 1, wherein the second communication channel uses a secure communication protocol.

9. A system for asynchronous side channel cipher renegotiation, comprising:
    a first computing device;
    a second computing device;
    a first communication channel established between the first computing device and the second computing device, where the first communication channel is an encrypted tunnel and packages exchanged using the encrypted tunnel are encrypted using a first cipher; and a second communication channel established between the first computing device and the second computing device, wherein the first computing device includes
- a receiver receiving a renegotiation request from the second computing device using the second communication channel, where the renegotiation request includes at least a password value and a relative time, and
- a processor generating a second cipher using at least an encryption protocol and the password value, wherein
- the receiver further receives a new encrypted packet from the second computing device using the first communication channel, and
- the processor further decrypts the new encrypted packet using the second cipher.

10. The system of claim 9, wherein the renegotiation request further includes the encryption protocol.

11. The system of claim 9, wherein the new encrypted packet is received after the relative time has passed since receipt of the renegotiation request.

12. The system of claim 9, wherein the processor of the first computing device further decrypts the new encrypted packet using the first cipher upon decryption failure using the second cipher.

13. The system of claim 12, wherein the first cipher is used upon decryption failure for a predetermined period of time and/or predetermined number of received packets.

14. The system of claim 13, wherein the first computing device deletes the first cipher from a memory of the first computing device after the predetermined period of time and/or predetermined number of received packets.

15. The system of claim 9, wherein the first computing device further includes a memory storing the first cipher and the second cipher.

16. The system of claim 9, wherein the second communication channel uses a secure communication protocol.

* * * * *